US008613198B2

(12) United States Patent
Swinford

(10) Patent No.: US 8,613,198 B2
(45) Date of Patent: Dec. 24, 2013

(54) METHOD AND APPARATUS FOR CONTROLLING COMPRESSOR BLEED AIRFLOW OF A GAS TURBINE ENGINE USING A BUTTERFLY VALVE ASSEMBLY

(75) Inventor: Mark Douglas Swinford, Centerville, OH (US)

(73) Assignee: Unison Industries, LLC, Jacksonville, FL (US)

( * ) Notice: Subject to any disclaimer, the term of this patent is extended or adjusted under 35 U.S.C. 154(b) by 1035 days.

(21) Appl. No.: 12/646,257

(22) Filed: Dec. 23, 2009

(65) Prior Publication Data

US 2011/0146296 A1    Jun. 23, 2011

(51) Int. Cl.
*F02C 6/04* (2006.01)

(52) U.S. Cl.
USPC ............ 60/785; 60/782; 137/1; 137/565.13; 251/279; 251/58

(58) Field of Classification Search
USPC ................ 60/782, 785; 251/279, 58, 129.2; 137/565.13, 1
See application file for complete search history.

(56) References Cited

U.S. PATENT DOCUMENTS

| | | | |
|---|---|---|---|
| 405,861 A * | 6/1889 | Shepherd et al. | 251/111 |
| 2,744,719 A * | 5/1956 | McRae | 251/58 |
| 3,052,260 A * | 9/1962 | Weis | 137/565.13 |
| 3,452,961 A * | 7/1969 | Forsman | 251/31 |
| 3,545,486 A * | 12/1970 | Larson | 137/554 |
| 3,568,975 A * | 3/1971 | Obermaier et al. | 251/58 |
| 3,669,405 A * | 6/1972 | Baum | 251/279 |
| 3,804,124 A * | 4/1974 | Finke et al. | 137/630.14 |
| 4,691,689 A * | 9/1987 | Shepherd et al. | 126/295 |
| 4,776,562 A | 10/1988 | Kalaskie et al. | |
| 5,354,234 A * | 10/1994 | Arold et al. | 454/69 |
| 6,775,990 B2 | 8/2004 | Swinford | |
| 6,986,257 B2 | 1/2006 | Swinford | |
| 7,537,022 B2 | 5/2009 | LaBenz et al. | |
| 2009/0217986 A1 | 9/2009 | Swinford | |
| 2009/0217987 A1 | 9/2009 | Swinford | |

* cited by examiner

*Primary Examiner* — William H Rodriguez
(74) *Attorney, Agent, or Firm* — Matthew P. Hayden, Esq.; Armstrong Teasdale LLP

(57) ABSTRACT

A method and apparatus for controlling fluid flow is provided. The valve assembly includes a valve body including a longitudinal axis and a radially inner internal flow passage extending axially between an inlet opening and an outlet opening, a disk selectively positionable to modulate a flow of working fluid through the flow passage, and a radially outer external surface. The valve assembly further includes a first actuator positioned radially outboard of the external surface, a second actuator positioned radially outboard of the external surface, and a first linkage including a first actuator end configured to couple to the first actuator, a second actuator end configured to couple to the second actuator, and a rod end configured to couple to the disk, wherein an actuating force applied from each actuator to each respective actuator end is combined through the first linkage to the rod end.

17 Claims, 4 Drawing Sheets

METHOD AND APPARATUS FOR CONTROLLING COMPRESSOR BLEED AIRFLOW OF A GAS TURBINE ENGINE USING A BUTTERFLY VALVE ASSEMBLY

BACKGROUND OF THE INVENTION

This invention relates generally to gas turbine engines and more particularly, to a method and apparatus used to regulate fluid flow for a gas turbine engine.

At least some known gas turbine engines include an engine casing that extends circumferentially around a compressor, and a turbine including a rotor assembly and a stator assembly. Within some engines, a plurality of ducting and valves coupled to an exterior surface of the casing are used to channel fluid flow from one area of the engine for use within another area of the engine. For example, such ducting and valves may form a portion of an environmental control system (ECS).

Typically, valve assemblies are used to control fluid flow that is at a high temperature and/or high pressure. Such valve assemblies include a substantially cylindrical valve body that is coupled between adjacent sections of ducting. The valve body includes a valve sealing mechanism that is selectively positionable to control fluid flow through the valve. More specifically, at least some known valves include a single piston/cylinder arrangement that is positioned external to the valve body and is coupled to the valve sealing mechanism to provide the motive force necessary to selectively position the valve sealing mechanism.

Because the piston/cylinder arrangement is offset from the main valve body, a center of gravity of the valve assembly is typically displaced a distance from a centerline axis of the valve body. Such an eccentric center of gravity may induce bending stresses into the valve assembly, adjoining tubing, and supporting brackets during engine operation. Depending on the application, the physical size and weight of the piston/cylinder arrangement may also present difficulties during the duct routing phase of the engine design.

A concentric valve is one way to address such difficulties. The concentric valve as described in U.S. Pat. Nos. 6,775,990 and 6,986,257 features an actuation piston that surrounds the flowbody of the valve, hence the name. This piston is sized so that the inner and outer diameters of the piston form an actuation area that fluid pressure works against. This area is typically set to achieve a force margin of at least 3:1, after accounting for all resistive forces. The fluid pressure level acting on the piston is usually set by the system architecture. In some cases, the actuation fluid (fuel) pressure is reasonably low, at about 130 psid for example. For other cases, the fluid pressure is much higher, at up to about 900 psid.

The pressure level and other geometrical constraints can create a situation where it is not practical to have an actual concentric piston surrounding the flowbody. Cases of extremely high pressure may necessitate a piston with a wall thickness of only 0.030" to achieve a 3:1 force margin. Such a constraint may not be practical as there is not enough space for guide seal glands, and it is not desirable to place the glands in the housing walls. Additionally, to handle the high burst pressure conditions (3000 psia in some cases) the actuator housing walls have to be sized to resist the hoop stresses. While it is possible to make a concentric valve for such applications there is a penalty incurred in the form of weight and packaging volume.

BRIEF DESCRIPTION OF THE INVENTION

In one embodiment, a valve assembly includes a valve body including a longitudinal axis and a radially inner internal flow passage extending axially between an inlet opening and an outlet opening, a disk selectively positionable to modulate a flow of working fluid through the flow passage, and a radially outer external surface. The valve assembly further includes a first actuator positioned radially outboard of the external surface, a second actuator positioned radially outboard of the external surface, and a first linkage including a first actuator end configured to couple to the first actuator, a second actuator end configured to couple to the second actuator, and a rod end configured to couple to the disk, wherein an actuating force applied from each actuator to each respective actuator end is combined through the first linkage to the rod end.

In another embodiment, a method of controlling fluid flow includes channeling a flow of fluid through a body of a valve, the body including a longitudinal axis, modulating the flow of fluid through body of the valve using a disk member, and controlling the position of the disk member using a plurality of actuators, each coupled to the disk member, wherein a center of mass of the body of the valve and the plurality of actuators is substantially concentric with the longitudinal axis.

In yet another embodiment, a gas turbine engine system includes a compressor, a valve assembly coupled in flow communication with the compressor wherein the valve assembly is configured to channel a fluid from the compressor to an outlet pipe. The valve assembly includes a valve body extending along a longitudinal axis and a radially inner internal flow passage extending axially between an inlet opening and an outlet opening, a disk selectively positionable to modulate a flow of working fluid through the flow passage, and a radially outer external surface. The valve assembly further includes a plurality of actuators positioned radially outboard of the external surface, and a first linkage including a first actuator end coupled to the first actuator, a second actuator end coupled to the second actuator, and a rod end coupled to the disk, wherein an actuating force applied from each actuator to each respective actuator end is combined through the first linkage to the rod end and wherein a center of mass of the body of the valve and the plurality of actuators is substantially concentric with the longitudinal axis.

BRIEF DESCRIPTION OF THE DRAWINGS

FIG. 1 is a side view of a gas turbine engine assembly that may be used with embodiments of the present invention;

FIG. 2 is an exploded view of the valve assembly shown in FIG. 1 in accordance with an exemplary embodiment of the present invention;

FIG. 3 is a cutaway view of the valve assembly shown in FIG. 1 in accordance with an exemplary embodiment of the present invention; and FIG. 4 is a cutaway view of the valve assembly shown in FIG. 1 in accordance with an exemplary embodiment of the present invention.

DETAILED DESCRIPTION OF THE INVENTION

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The following detailed description illustrates embodiments of the invention by way of example and not by way of limitation. It is contemplated that the invention has general application to assembly and process control embodiments of fluid flow control in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
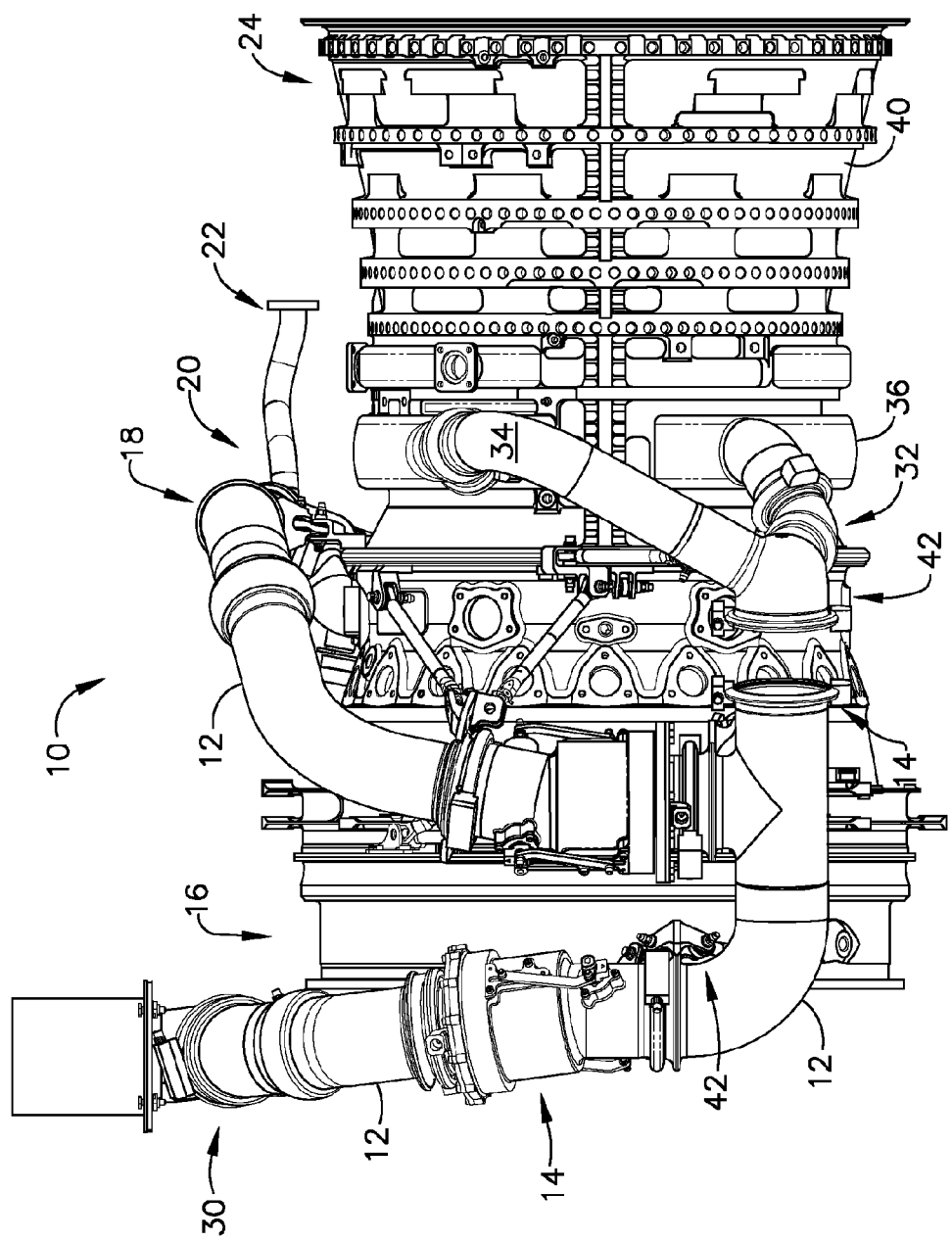
FIGS. 1-4 show exemplary embodiments of the method and apparatus described herein.

FIG. 1 is a side view of a gas turbine engine assembly 10 that may be used with embodiments of the present invention. In the exemplary embodiment, gas turbine engine assembly 10 includes a plurality of ducting 12 coupled together by a plurality of valve assemblies 14. Gas turbine engine assembly 10 includes a high-pressure compressor assembly 16, a combustor 18, and a turbine assembly 20. In one embodiment, high-pressure compressor assembly 16 is a high-pressure compressor. Gas turbine engine assembly 10 also includes a low-pressure turbine (not shown) and a fan assembly (not shown). In one embodiment, gas turbine engine assembly 10 is a CF34 engine commercially available from General Electric Company, Cincinnati, Ohio.

In the exemplary embodiment, ducting 12 and valve assemblies 14 form a portion of an engine build up (EBU) 30. More specifically, ducting 12 and valve assemblies 14 facilitate channeling and controlling, respectively, fluid flow at a high temperature, and/or at a high pressure, from one area of gas turbine engine assembly 10 for use in another area. For example, in one embodiment, fluid flowing through ducting 12 and valve assemblies 14 has an operating temperature that is greater than about 1000° F. and/or an operating pressure of greater than about 300 psi.

In the exemplary embodiment, ducting 12 includes a Y-duct 32 that facilitates splitting EBU 30 into a pair of inlet duct assemblies 34 and 36 that are coupled to an engine casing 40 by a plurality of mounting bracket assemblies 42. More specifically, inlet duct assemblies 34 and 36 are coupled in flow communication to high-pressure compressor assembly 16 for routing bleed air from high-pressure compressor assembly 16 for use in other areas, such as an environmental control system.

Figure 2:
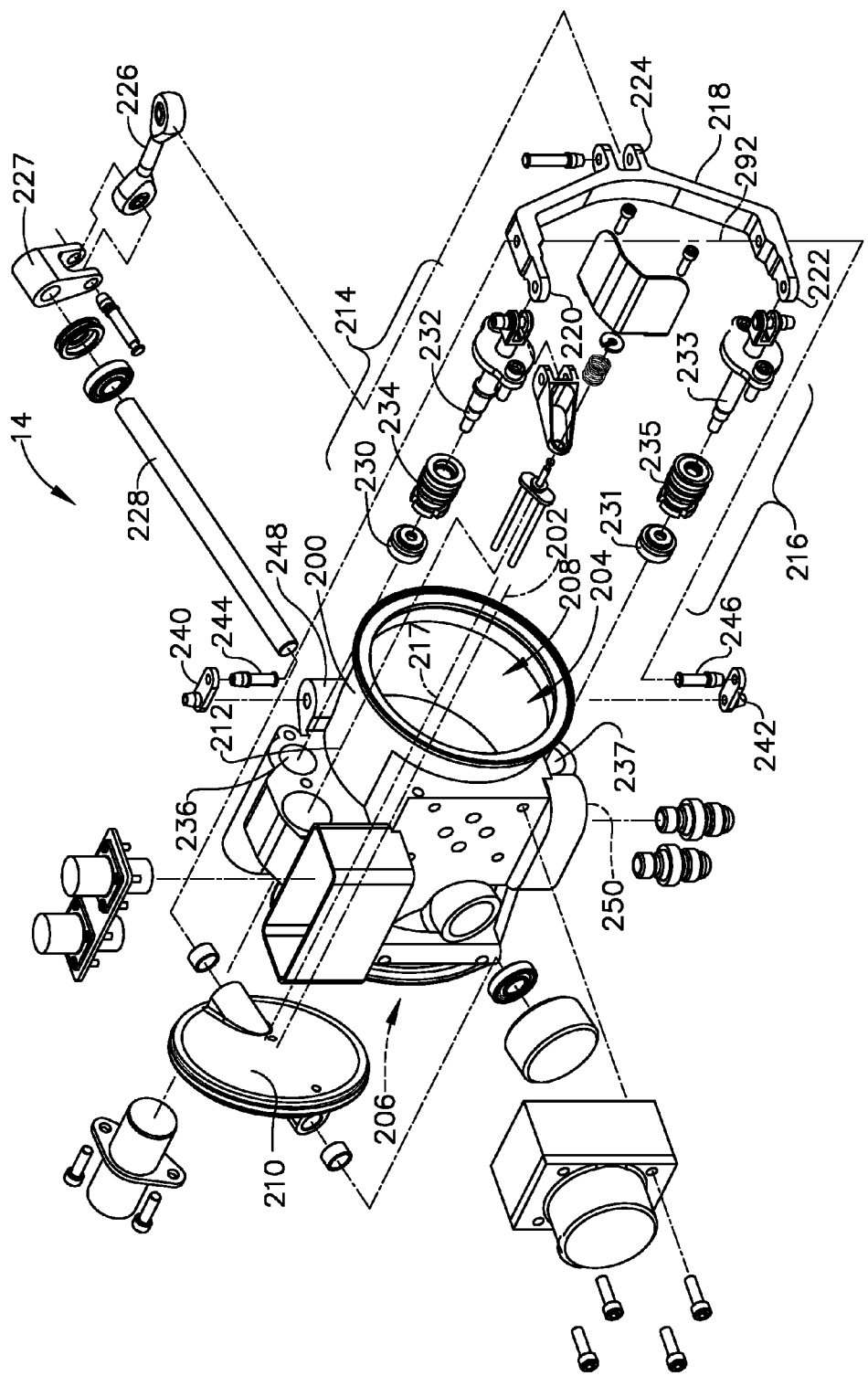

FIG. 2 is an exploded view of valve assembly 14 (shown in FIG. 1) in accordance with an exemplary embodiment of the present invention. In the exemplary embodiment, valve assembly 14 includes a valve body 200 having a longitudinal axis 202 and a radially inner internal flow passage 204 extending axially between an inlet opening 206 and an outlet opening 208, a disk 210 is selectively positionable to modulate a flow of fluid such as, but not limited to, compressor bleed air through flow passage 204. Valve body 200 also includes a radially outer external surface 212. Valve assembly 14 includes a first actuator 214 and a second actuator 216 each positioned radially outboard of external surface 212. In one embodiment, first actuator 214 and second actuator 216 are positioned 180° apart circumferentially with respect to longitudinal axis 202. In various other embodiments, first actuator 214 and second actuator 216 are positioned at other than 180° apart circumferentially with respect to longitudinal axis 202. In yet other embodiments, additional actuators, such as, but not limited to, a third (not shown) and a fourth actuator (not shown) may be used. In another embodiment, first actuator 214 and second actuator 216 are spaced circumferentially about valve body 200 such that a centerline of mass 217 passing through valve assembly 14 is substantially concentric with longitudinal axis 202.

Valve assembly 14 includes a first linkage 218 comprising a first actuator end 220 configured to couple to first actuator 214, a second actuator end 222 configured to couple to second actuator 216, and a rod end 224 configured to couple to disk 210. In one embodiment, first linkage 218 is wishbone-shaped. In the exemplary embodiment, rod end 224 is configured to couple to disk 210 using a tie rod 226, a crank arm 227, and a shaft 228. An actuating force applied from each actuator 214, 216 to each respective actuator end 220, 222 is combined through first linkage 218 to rod end 224. In the exemplary embodiment, actuators 214 and 216 comprises a piston 230, 231, a piston rod 232, 233, a rod bushing 234, 235, and a cylinder 236, 237 forming piston-type actuators. The pistons of actuators 214 and 216 are positioned in cylinders 236 and 237, respectively, by a pressure of a working fluid such as, but not limited to, liquid fuel acting on the pistons. In the exemplary embodiment, the working fluid is coupled to actuators 214 and 216 such that the pistons work in parallel and impart substantially equal force to rod end 224 through first linkage 218. In an alternate embodiment, at least one of first actuator 214 and second actuator 216 comprises an electric drive.

First linkage 218 is coupled to valve body 200 using pivot links 240 and 242 and respective pins 244 and 246. Pivot link 240 and pin 244 couple first linkage 218 to a first boss 248 on valve body 200. Pivot link 242 and pin 246 couple first linkage 218 to a second boss 250 (hidden behind valve body 200 in FIG. 2) on valve body 200.

During operation, a movement of pistons 230 and 231 acting on actuators ends 220 and 222 respectively causes first linkage 218 to rotate about an axis of rotation 292 extending though pins 244 and 246. Pivot links 242 and 246 allow axis of rotation 292 to translate transversely to movement of actuators 214 and 216, thereby maintaining pure translation of actuator ends 220, 222. The rotation of first linkage 218 causes rod end 224 to move in an open direction 253 toward inlet opening 206 to open valve assembly 14 or to move in a close direction 254 toward outlet opening 208 to close valve assembly 14. A fluid such as, but not limited to, liquid fuel being introduced into cylinders 236 and 237 at substantially equal pressures forces piston rods 232 and 233 to move within cylinders 236 and 237 respectively. Resilient bushings 234 and 235 include glands for o-rings for sealing purposes, and internal dynamic cup seals to seal pressure with respect to the piston rods. In various embodiments, for fail open or fail closed operation, springs may be positioned to move piston rods 232 and 233 within cylinders 236 and 237 respectively to position disk 210 in the open or closed position upon loss of fuel pressure.

Figure 3:
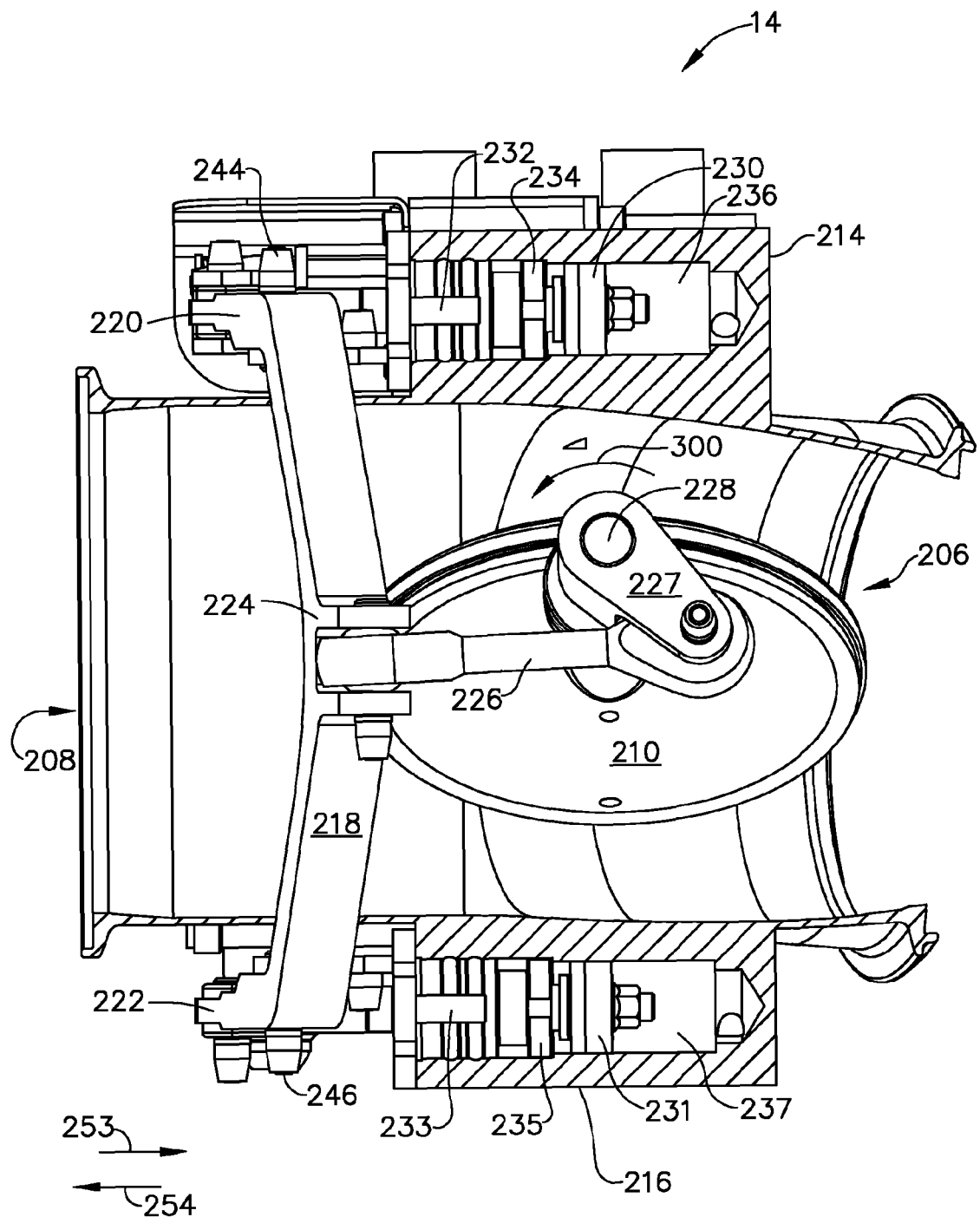

FIG. 3 is a cutaway view of valve assembly 14 (shown in FIG. 1) in accordance with an exemplary embodiment of the present invention. In the exemplary embodiment, valve assembly 14 is shown in an open position. To position disk 210 in the open position, a pressurized fluid is introduced into cylinders 236 and 237 above pistons 230 and 231, which causes pistons 230 and 231 to move towards outlet opening 208 imparting a force onto actuator ends 220 and 222 of first linkage 218. First linkage 218 pivots about pins 244 and 246 moving rod end 224 towards inlet opening 206, which rotates shaft 228 in a counterclockwise direction 300 through tie rod 226 and crank arm 227 pinned to tie rod 226.

Figure 4:
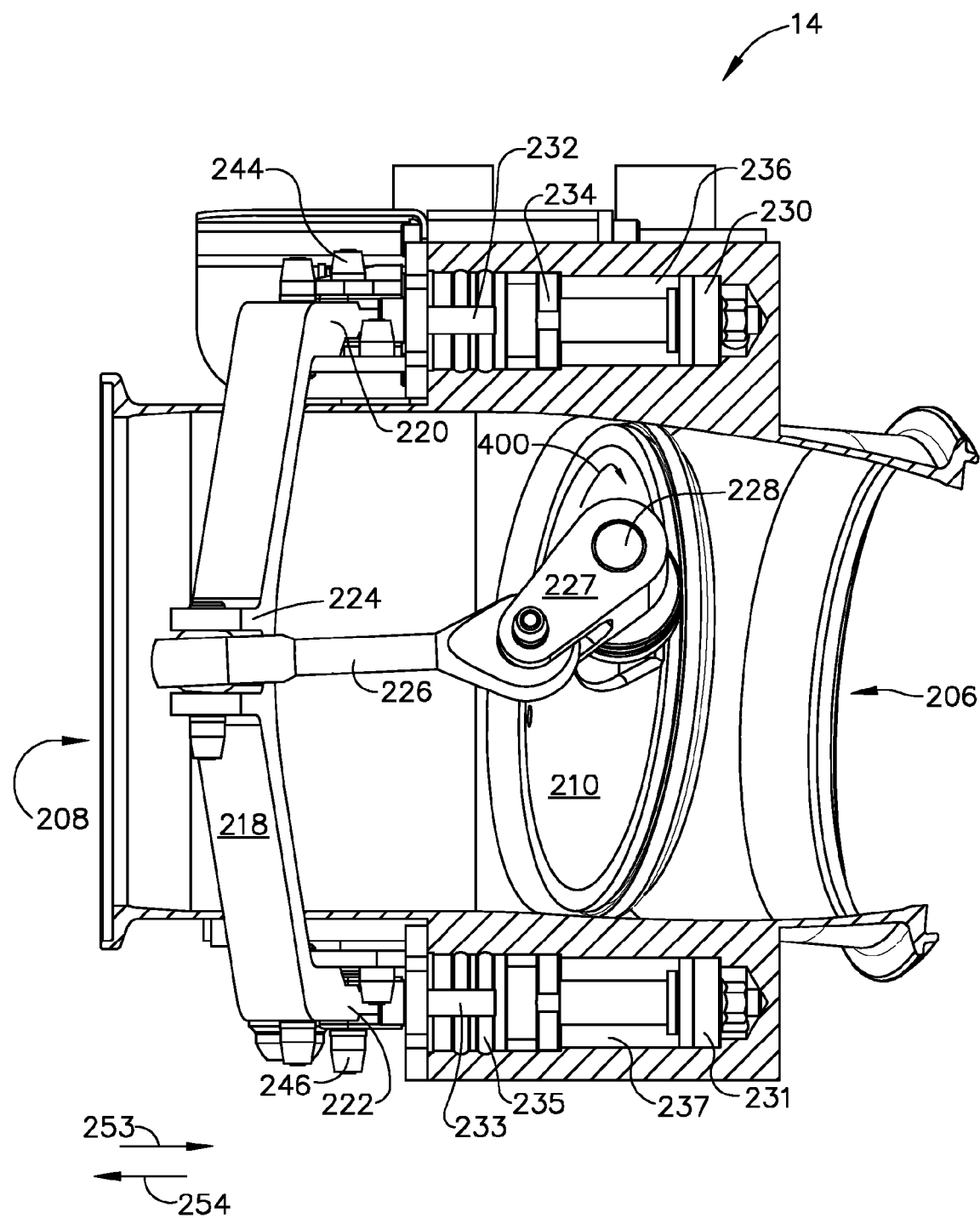

FIG. 4 is a cutaway view of valve assembly 14 (shown in FIG. 1) in accordance with an exemplary embodiment of the present invention. In the exemplary embodiment, valve assembly 14 is shown in a closed position. To position disk 210 in the closed position, a pressurized fluid is introduced into cylinders 236 and 237 beneath pistons 230 and 231, which causes pistons 230 and 231 to move towards inlet opening 206 imparting a force onto actuator ends 220 and 222 of first linkage 218. First linkage pivots about pins 244 and 246 moving rod end 224 towards outlet opening 208, which rotates shaft 228 in a clockwise direction 400 through tie rod 226 and crank arm 227 pinned to tie rod 226.

Embodiments of the invention use two or more piston actuators positioned at 180 degrees spacing from one another. Using two relatively small pistons offered a 35% weight savings over a similar design with a concentric piston, largely a result of smaller actuator cavity volumes resisting burst pressure. Use of two pistons with a "Wishbone" intermediate linkage to join the output forces from each piston provides similar power to move disk 210 in a smaller lighter valve assembly 14.

These pistons need not be positioned at exactly 180 degrees, because independent pistons mitigate the cocking likelihood of a concentric piston without balanced output. The pistons could in fact be located next to one another noting that as the pistons are placed closer to one another (from 180 degrees), ancillary hardware such as an LVDT and servo valve are moved closer to the pistons, increasing a center of mass eccentricity. The mass concentric valve assembly 14 includes two separate pistons driving a wishbone linkage. This configuration may be used when actuation pressure is extremely high, rendering a concentric piston impractical. The two separate pistons promote a more centered valve mass than can be achieved with a legacy offset actuator type valve, and promote a more generally compact valve.

The above-described embodiments of a method and apparatus for controlling fluid flow provides a cost-effective and reliable means reducing the size and weight of a valve assembly in applications where a relatively high actuation pressure is needed. More specifically, the method and apparatus described herein facilitate evenly distributed force from a plurality of actuators spaced circumferentially about the valve assembly. As a result, the method and apparatus described herein facilitate controlling fluid flow in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A valve assembly comprising:
a valve body comprising a longitudinal axis and a radially inner internal flow passage extending axially between an inlet opening and an outlet opening, a disk selectively positionable to modulate a flow of working fluid through said flow passage, and a radially outer external surface;
a first actuator positioned radially outboard of said external surface;
a second actuator positioned radially outboard of said external surface;
a first linkage comprising a first actuator end configured to couple to said first actuator, a second actuator end configured to couple to said second actuator, and a rod end configured to couple to said disk;
wherein an actuating force applied from each actuator to each respective actuator end is combined through said first linkage to said rod end.

2. A valve assembly in accordance with claim 1 wherein at least one of said first actuator and said second actuator comprises a piston and cylinder actuator.

3. A valve assembly in accordance with claim 1 wherein at least one of said first actuator and said second actuator comprises a piston and cylinder actuator wherein the cylinders of said first actuator and said second actuator are coupled in parallel flow communication with respect to a source of working fluid.

4. A valve assembly in accordance with claim 1 wherein at least one of said first actuator and said second actuator comprises an electric drive.

5. A valve assembly in accordance with claim 1 wherein said first actuator and said second actuator comprises a pair of actuators spaced circumferentially about said valve body.

6. A valve assembly in accordance with claim 1 wherein said first actuator and said second actuator comprises a pair of actuators spaced circumferentially about said valve body such that a centerline of mass passing through the valve assembly is substantially concentric with the longitudinal axis.

7. A valve assembly in accordance with claim 1 wherein said first actuator and said second actuator comprises a pair of actuators spaced approximately one hundred eighty degrees apart.

8. A valve assembly in accordance with claim 1 wherein said first actuator and said second actuator comprises a pair of actuators spaced less than one hundred eighty degrees apart.

9. A valve assembly in accordance with claim 1 wherein said first linkage comprises a wishbone-shaped linkage.

10. A valve assembly in accordance with claim 1 wherein said flow of working fluid comprises a flow of compressor bleed air.

11. A valve assembly in accordance with claim 1 wherein at least one of said first actuator and said second actuator are actuated by a fluid acting on a piston wherein said fluid comprises a liquid fuel.

12. A method of controlling air flow in a gas turbine engine, said method comprising:
channeling the air flow through a body of a butterfly valve of the gas turbine engine, the body comprising a longitudinal axis;
modulating the flow of fluid through body of the valve using a disk member; and
controlling the position of the disk member using a plurality of actuators by controlling a force acting on the plurality of actuators, each coupled to the disk member using a wishbone linkage that includes a connection to each of the plurality of actuators and to the disk member, wherein a center of mass of the body of the valve and the plurality of actuators is substantially concentric with the longitudinal axis.

13. A method in accordance with claim 12 wherein controlling the position of the disk member comprises applying a fuel pressure to the actuator.

14. A gas turbine engine system comprising:
a compressor;
a valve coupled in flow communication with said compressor, said valve configured to channel a fluid from said compressor to an outlet pipe, said valve comprising:
a valve body extending along a longitudinal axis and a radially inner internal flow passage extending axially between an inlet opening and an outlet opening, a disk selectively positionable to modulate a flow of working fluid through said flow passage, and a radially outer external surface;
a plurality of actuators positioned radially outboard of said external surface;
a first linkage comprising a first actuator end coupled to a first actuator of said a plurality of actuators, a second actuator end coupled to a second actuator of said a plurality of actuators, and a rod end coupled to said disk,
wherein an actuating force applied from each actuator to each respective actuator end is combined through said first linkage to said rod end and wherein a center of mass of the body of the valve and the plurality of actuators is substantially concentric with the longitudinal axis.

15. A system in accordance with claim 14 wherein said plurality of actuators comprises a piston and cylinder actuator wherein the cylinders of said plurality of actuators are coupled in parallel flow communication with respect to a source of actuating fluid.

16. A system in accordance with claim 14 wherein said disk comprises a butterfly disk.

17. A system in accordance with claim 14 wherein said actuators comprise an electric drive.

* * * * *